US012686268B2

(12) United States Patent
Harasim et al.

(10) Patent No.: US 12,686,268 B2
(45) Date of Patent: Jul. 21, 2026

(54) OPERATING DEVICE FOR A VEHICLE

(71) Applicant: Bayerische Motoren Werke Aktiengesellschaft, Munich (DE)

(72) Inventors: Thomas Harasim, Puchheim (DE); Matthias Lindner, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/192,791

(22) Filed: Apr. 29, 2025

(65) Prior Publication Data

US 2025/0340117 A1 Nov. 6, 2025

(30) Foreign Application Priority Data

May 6, 2024 (DE) ..................... 10 2024 112 708.2

(51) Int. Cl.
*B60K 35/10* (2024.01)
*B60K 35/60* (2024.01)
*B60K 35/80* (2024.01)

(52) U.S. Cl.
CPC .............. *B60K 35/10* (2024.01); *B60K 35/60* (2024.01); *B60K 35/80* (2024.01); *B60K 2360/1446* (2024.01); *B60K 2360/27* (2024.01); *B60K 2360/334* (2024.01); *B60K 2360/34* (2024.01); *B60K 2360/345* (2024.01); *B60K 2360/774* (2024.01)

(58) Field of Classification Search
CPC ......... B60K 35/10; B60K 35/60; B60K 35/80
USPC .................................. 345/173, 174
See application file for complete search history.

(56) References Cited

U.S. PATENT DOCUMENTS

| | | | |
|---|---|---|---|
| 11,748,991 B1* | 9/2023 | Day | B60Q 3/85 348/143 |
| 2006/0075934 A1* | 4/2006 | Ram | B64D 11/0015 108/44 |
| 2014/0002366 A1* | 1/2014 | Gluckstad | H01H 3/125 345/168 |

(Continued)

FOREIGN PATENT DOCUMENTS

| | | |
|---|---|---|
| DE | 10 2012 206 661 A1 | 10/2013 |
| DE | 10 2013 226 225 A1 | 6/2015 |
| DE | 10 2015 006 075 A1 | 2/2016 |

(Continued)

OTHER PUBLICATIONS

German-language Search Report issued in German Application No. 10 2024 112 708.2 dated Mar. 31, 2025 with partial English translation (12 pages).

*Primary Examiner* — Calvin C Ma
(74) *Attorney, Agent, or Firm* — Crowell & Moring LLP

(57) ABSTRACT

An operating device for a vehicle, in particular a motor vehicle, includes: (i) an operating element having a base body with a surface that features a plurality of segments; (ii) wherein two of the plurality of segments are arranged on different planes relative to each other; (iii) wherein the two segments are each configured to be touch-sensitive; (iv) a control unit that is operatively connected to the operating element and is configured to: (iv-1) assign a vehicle function to each of the two segments depending on a predetermined criterion; (iv-2) trigger the vehicle function assigned to one of the segments upon receiving a user input by touching the respective segment.

20 Claims, 2 Drawing Sheets

(56)     References Cited

U.S. PATENT DOCUMENTS

2021/0143818 A1     5/2021   Carvalho et al.
2024/0200385 A1*    6/2024   Sone ....................... E05F 15/40

FOREIGN PATENT DOCUMENTS

DE     10 2016 124 415 A1     6/2018
DE     10 2017 113 660 B3    10/2018
DE     10 2019 129 797 A1     5/2021

* cited by examiner

200

100

210

300

210

320

100

310

OPERATING DEVICE FOR A VEHICLE

CROSS REFERENCE TO RELATED APPLICATION

This application claims priority under 35 U.S.C. § 119 from German Patent Application No. 10 2024 112 708.2, filed May 6, 2024, the entire disclosure of which is herein expressly incorporated by reference.

BACKGROUND AND SUMMARY

The present invention relates to an operating device for a vehicle and a vehicle.

Modern vehicles are increasingly equipped with driver assistance systems (Advanced Driver Assistance Systems, ADAS) designed to support the driver in certain driving situations. This support ranges from merely displaying potentially relevant information (e.g., issuing a warning through a lane change assistant), to partially autonomous interventions (e.g., regulating the torque applied to the wheel axles by an anti-lock braking system), and even to fully autonomous interventions in the control of the vehicle (e.g., adaptive speed regulation by an Adaptive Cruise Control system, ACC).

Such driver assistance systems are generally based on sensor data, such as signals provided by ultrasonic sensors, radar sensors, or cameras, which allow the current driving situation to be determined and the corresponding driver assistance system function to be executed in response.

Furthermore, modern vehicles contain a wide variety of additional functions that can be activated manually, semi-automatically, or even automatically. These include windshield wipers, power windows, ventilation, heating, window defrosting, radio settings, navigation system, and more. A navigation system can display a route as well as related traffic information, such as speed limits, tunnels, and toll roads. These exemplary vehicle functions can typically be activated or controlled either directly via an operating element or control knob, or via a display, in particular a central display, also known as a CID (central information display).

The control knobs for different functions may be located at various positions within the vehicle interior. A user, especially a driver, must first determine the location at which the respective function can be adjusted, and then reach out with a hand to operate the corresponding control. For example, the power windows on the driver's side may be operated with the driver's left hand, and a ventilation control may be operated with the right hand, which may require switching hands. When operating the display, it may be necessary to first locate the desired function in a submenu.

The object of the present invention is to provide an improved operating device that enables a user to easily access and adjust different functions.

A solution to this object is achieved according to the teaching of the independent claims. Various embodiments and developments of the present invention are the subject matter of the dependent claims.

A first aspect of the solution relates to an operating device for a vehicle, in particular a motor vehicle, comprising: (i) an operating element comprising a base body with a surface that features a plurality of segments; (ii) wherein two of the plurality of segments are arranged on different planes relative to each other; (iii) wherein the two segments are each configured to be touch-sensitive; (iv) a control unit that is operatively connected to the operating element and is configured to: (iv-1) assign a vehicle function to each of the two segments depending on a predetermined criterion; (iv-2) trigger the vehicle function assigned to one of the segments upon receiving a user input by touching the respective segment.

The terms "comprises", "includes", "contains", "has", "with", or any variant thereof, as used herein, are intended to cover non-exclusive inclusion. For example, a method or device that comprises or includes a list of elements is not necessarily limited to those elements, but may include other elements not explicitly listed or inherent to such method or device.

Furthermore, unless expressly stated otherwise, the term "or" refers to an inclusive "or" and not an exclusive "or." For example, a condition A or B is satisfied by any of the following: A is true (or present) and B is false (or absent), A is false (or absent) and B is true (or present), or both A and B are true (or present).

The terms "a" or "an" as used herein are defined as "one or more." The terms "another" and "a further," and any variant thereof, are to be understood as "at least one additional."

The term "plurality" as used herein is to be understood as "two or more."

The term "configured" or "adapted" to perform a specific function (and variations thereof) as used herein is understood to mean that the respective device is already in a configuration or setting in which it can perform the function, or is at least configurable—that is, capable of being set—such that it can perform the function upon being appropriately configured. Configuration may be achieved, for example, by setting parameters of a process or by switches or similar elements to activate or deactivate functionalities or settings. In particular, the device may feature several predefined configurations or operating modes, so that configuration can be achieved by selecting one of these configurations or operating modes.

The term "control unit" as used herein particularly refers to an electronic device that at least partially controls the operation of a vehicle device, particularly by means of a processor, especially a CPU. In particular, the control unit may include a transmission and reception unit for sending and receiving wireless signals, such as electromagnetic signals, and/or wired signals via cables, such as electrical signals. Such a control unit may comprise a microprocessor for analyzing received and/or stored data and/or for initiating a control process.

The term "function" or "functions" as used herein refers to vehicle functions, such as functions of the infotainment system or other vehicle-related or driving-related functions. However, it is also intended to include non-driving-related functions or applications that can be executed in the vehicle but have no or at least no direct connection to the vehicle or driving, for example, entertainment functions such as computer or video games or other applications.

The operating device according to the first aspect allows for functions of a vehicle to be assigned to at least two segments based on a predetermined criterion. These assigned functions can be triggered simply by a user input in the form of touching the respective segment. Since the two segments of the operating element are arranged on different planes relative to each other, the user can distinguish the two segments by touch and thus associate the respective functions by tactile means, allowing for intuitive user input.

Preferred embodiments of the operating device will now be described, which can each be freely combined with one another and with the other aspects described, unless expressly excluded or technically impossible.

In some embodiments, the two touch-sensitive segments are each configured to, based on an electrical capacitive and/or inductive and/or resistive and/or piezoelectric change resulting from a user input on the respective segment of the two segments, send a signal representing the function assigned to the respective segment to the control unit. This allows the respective function to be reliably triggered. Furthermore, the respective technical solution can be implemented with an acceptable technical effort.

In some embodiments, each of the plurality of segments is arranged on a different plane from all the others in the plurality of segments. This allows a geometric arrangement that is particularly favorable for tactile recognition. Especially during prolonged use, a user—particularly the driver—can mentally assign the individual segments more quickly, since the form with segments on different planes becomes more strongly imprinted through repeated use. As a result, the level of attention required to operate the control element can be further reduced.

In some embodiments, the control element further comprises: (i) a projection device with a light source, arranged within the base body of the control element, and configured to project symbols—each representing the function of one of the two segments—from inside the base body onto the respective segment; (ii) wherein the two segments each have a semi-transparent area such that the projected symbol is visible from outside the control element. Projection devices and their principles are already used in vehicles, for example in so-called "head-up displays," in which content is projected onto a vehicle's windshield. Regarding the operating device described herein, the function assigned to each respective segment can, in addition to tactile identification—especially under poor lighting conditions—be recognized and verified. The projection device also makes it possible to adapt the symbols when the function assigned to a segment changes. This provides additional flexibility.

In some embodiments, the surface of the control element is made of glass, in particular crystal glass. This allows for easy manufacture of the respective segments. Furthermore, since glass is transparent, the projection of the symbols can be seen from outside the control element.

In some embodiments, each of the plurality of segments is touch-sensitive, and each of the plurality of segments is assigned a function. This allows each of the segments of the control element to be assigned a function, which can be triggered through a user input.

In some embodiments, the control unit is configured to determine, as a predetermined criterion, a value of a current physical parameter of the vehicle interior—specifically brightness and/or temperature and/or volume. This allows the user to easily trigger a function by touching the respective segment, which adjusts a physical parameter of the vehicle's interior. For example, if the interior temperature is relatively high due to sunlight and the vehicle's air conditioning system overcorrects by lowering the temperature too much, an additional manual adjustment may be beneficial. This can then be easily accomplished through user input at the control element.

In some embodiments, the control unit is configured to use a traffic situation—specifically a traffic jam or a tunnel passage—as the predetermined criterion. This allows the user to react quickly and intuitively to a changed traffic situation. For instance, during a tunnel passage, the user can activate the power windows via an input on one segment, causing the windows to close. In another example, a user may actively trigger a route recalculation in the event of a traffic jam.

In some embodiments, the control unit is configured to use a preconfigured user profile as the predetermined criterion. This enables functions frequently used by the user to be assigned to the respective segments. As a result, the user can trigger the relevant function with even less loss of attention.

A second aspect of the solution relates to a vehicle, in particular a motor vehicle, with an operating device according to the first aspect.

In some embodiments, the vehicle has a center console, and the control element of the operating device is arranged on the center console. This allows a user of the vehicle, especially the driver, to easily reach the control element, since a center console is typically positioned in the driving direction behind a handbrake lever. This reduces the driver's distraction when operating the control element while driving and enhances driving safety.

The features and advantages described in relation to the first aspect of the solution apply correspondingly to the other aspects described.

Further advantages, features, and application possibilities result from the following description of preferred embodiments in conjunction with the figures.

The figures show:

BRIEF DESCRIPTION OF THE DRAWINGS

In the figures, the same reference numerals are used consistently for the same or corresponding elements.

DETAILED DESCRIPTION OF THE DRAWINGS

Figures 1A, 1B:
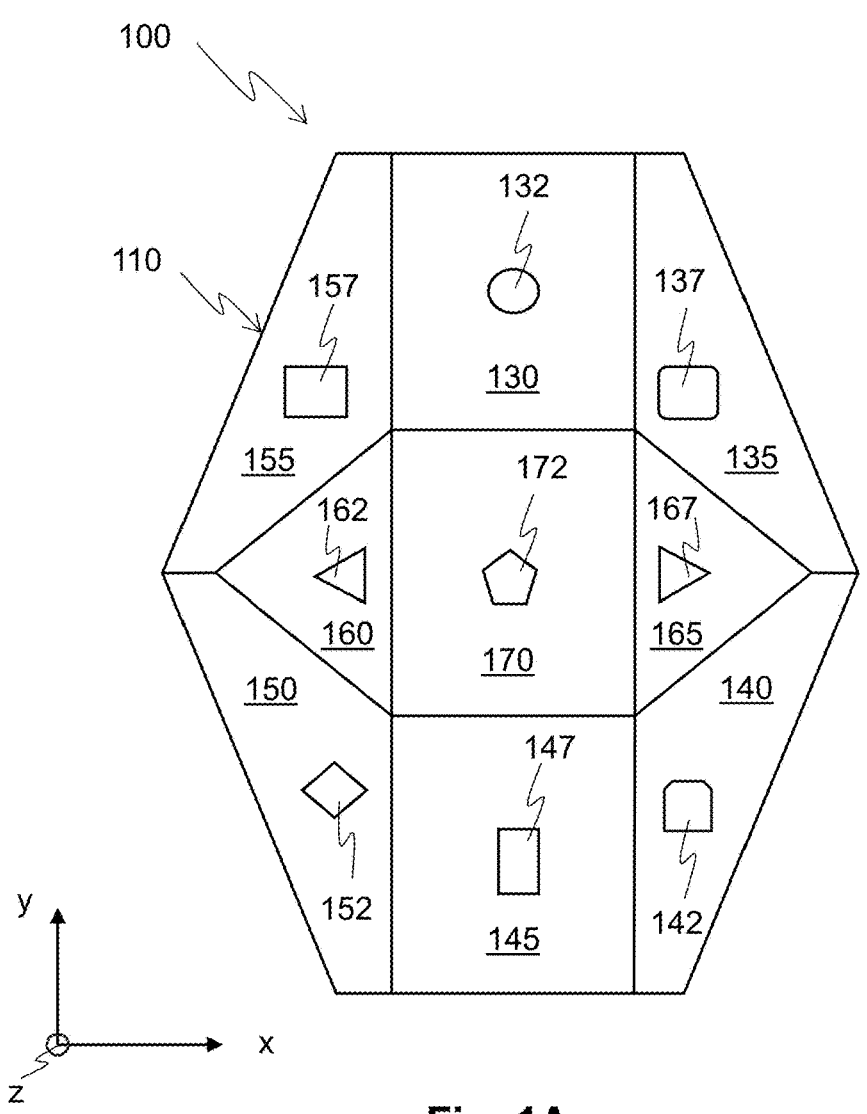
FIG. 1A: a schematic top view of a control element according to one embodiment.
FIG. 1B: a schematic side view of the control element from FIG. 1A.

In FIG. 1A, a schematic top view of a control element 100 according to one embodiment is shown. The control element 100 comprises a base body with a hexagonal base surface, which lies in the x-y plane of the schematically depicted coordinate system. From the base surface, a surface 110 extends in the z-direction. The surface 110 consists of a plurality of segments 130, 135, 140, 145, 150, 155, 160, 165, 170—a total of 9 in the present case. The number of segments may vary depending on the design of the control element 100 and may be more or fewer than 9. Each of the segments 130, 135, 140, 145, 150, 155, 160, 165, 170 is arranged on a different plane relative to each of the other segments 130, 135, 140, 145, 150, 155, 160, 165, 170—that is, no two segments are arranged parallel to each other. For example, the segment identified with reference numeral 170 is located at the highest position along the z-axis, and is parallel to the x-y plane, i.e., also parallel to the base surface and thus spaced apart from it. The segments 130, 145, 160, 165 each share an edge with segment 170. Starting from the respective shared edge, these segments (130, 145, 160, 165) form an inclined surface pointing in the z-direction toward the drawing plane. The inclined surfaces of segments 130 and 145, for example, extend from the base surface up to the shared edge with segment 170. Segments 135 and 140 each share an edge with segment 165, and each extends diagonally from the base surface up to the respective shared edge. Similarly, segments 150 and 155 each share an edge with segment 160, and likewise extend diagonally from the base surface up to the respective shared edge.

Each of the segments 130, 135, 140, 145, 150, 155, 160, 165, 170 can be assigned a function of the motor vehicle 300. Based on the respective position of a segment 130, 135, 140, 145, 150, 155, 160, 165, 170 on the control element, a user can assign a function. Furthermore, each of the segments 130, 135, 140, 145, 150, 155, 160, 165, 170 features a symbol. Therefore, the respective function can additionally be verified through the respective symbol 132, 137, 142, 147, 152, 157, 162, 167, 172.

The segments 130, 135, 140, 145, 150, 155, 160, 165, 170 are each configured to be touch-sensitive, which enables the function assigned to the respective segment 130, 135, 140, 145, 150, 155, 160, 165, 170 to be triggered. This touch-sensitive configuration may be based on electrical capacitive, inductive, resistive, or piezoelectric technology. Once a segment 130, 135, 140, 145, 150, 155, 160, 165, 170 has been identified by touch, the user can then trigger the function assigned to that segment.

A projection device may be arranged inside the base body (not shown here). If the respective segment features a material that is semi-transparent in the area of the symbol, the corresponding assigned symbol can be projected from within the control element 100 onto the segment. By using the light source, the respective symbol can be adapted and recognized even under poor lighting conditions. In FIG. 1A, geometric symbols 132, 137, 142, 147, 152, 157, 162, 167, 172 are shown as placeholders for the symbols. These can be replaced with symbols as commonly used in vehicles. The functions assigned to the segments can also be changed accordingly.

In FIG. 1B, a side view of the control element 100 in accordance with FIG. 1A is shown schematically. The side view is presented with respect to the drawing plane as viewed from the left of FIG. 1A. Accordingly, the coordinate system in FIG. 1B is adjusted with respect to the axes. FIG. 1B particularly illustrates the extension of the control element 100 in the z-direction. Furthermore, for the segment identified with reference numeral 160, its inclined orientation relative to the coordinate system is evident.

Figures 2, 3:
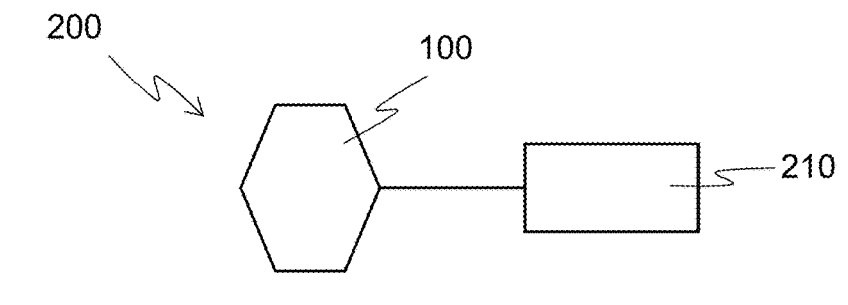
FIG. 2: a schematic view of an operating device according to one embodiment.
FIG. 3: a schematic view of a motor vehicle according to one embodiment.

In FIG. 2, an operating device 200 according to one embodiment is shown schematically. The operating device 200 comprises a control element 100 as shown in FIG. 1A or FIG. 1B and a control unit 210, which is connected to the control element 100 for signal transmission. As a result, the signals or inputs received by the segments 130, 135, 140, 145, 150, 155, 160, 165, 170 can be transmitted to the control unit 210. When the control unit 210 is installed in a motor vehicle 300, the control unit 210 can trigger in the motor vehicle 300 a function assigned to the segment 130, 135, 140, 145, 150, 155, 160, 165, 170 that received the input.

In FIG. 3, a motor vehicle 300 according to one embodiment is shown schematically. In the motor vehicle 300, a center console 310 is arranged, on which a control element 100 as shown in FIG. 1A or FIG. 1B is positioned. The control element 100 is connected for signal transmission to a control unit 210, as described with respect to FIG. 1A. Furthermore, a display 320 is arranged in the dashboard area of the motor vehicle.

The control unit 210 is configured to trigger a function assigned to one of the segments 130, 135, 140, 145, 150, 155, 160, 165, 170. For this purpose, the control unit 210 is connected to a respective system component of the motor vehicle 300 that can execute the function. This is indicated by the arrow leading away from the control unit. System components include the driver assistance systems mentioned initially, as well as the other functions such as ventilation and heating. On the display 320, which is also connected to the control unit 210 for signal transmission, the current assignments of the respective functions to the respective segments 130, 135, 140, 145, 150, 155, 160, 165, 170 can be displayed. In this way, a user can additionally obtain information about the current assignment.

While at least one exemplary embodiment has been described above, it should be noted that a large number of variations exist. It should also be noted that the exemplary embodiments described are only non-limiting examples, and are not intended to limit the scope, applicability, or configuration of the devices and methods described herein. Rather, the foregoing description will provide those skilled in the art with guidance for implementing at least one exemplary embodiment, it being understood that various changes may be made in the functionality and arrangement of the elements described in an exemplary embodiment without departing from the subject matter as defined in the appended claims and their legal equivalents.

REFERENCE NUMBER LIST

100 Control element
110 Surface
130, 135, 140, 145 Segment
150, 155, 160, 165, 170 Segment
132, 137, 142, 147 Symbol
152, 157, 162, 167, 172 Symbol
200 Operating device
210 Control unit
300 Motor vehicle
310 Center console
320 Display

What is claimed is:

1. An operating device for a vehicle, the operating device comprising:
   a control element, including a base body with a hexagonal base surface that has a plurality of segments, each of which is arranged in a different plane;
   wherein two segments of the plurality of segments are arranged on different planes relative to each other;
   wherein the two segments are configured to be touch-sensitive;
   a control unit connected to the control element for signal transmission, wherein the control unit is configured to:
   assign a function of the vehicle to each of the two segments depending on a predetermined criterion;
   upon receiving a user input by touching one segment of the two segments, trigger the function of the vehicle that is assigned to the one segment.

2. The operating device according to claim 1, wherein the two segments are each configured to, based on an electrical capacitive and/or inductive and/or resistive and/or piezoelectric change caused by the user input at a respective segment of the two segments, send a signal representing the function assigned to the respective segment to the control unit.

3. The operating device according to claim 2, wherein each of the plurality of segments is arranged on a different plane from all other segments of the plurality of segments.

4. The operating device according to claim 2, wherein the control element further comprises:
   a projection device, including a light source arranged inside the base body of the control element and configured to project symbols, each of the symbols representing the functions of the two segments, from inside the base body onto the respective segment;

wherein the two segments each have a semi-transparent area such that a projected symbol is visible from outside the control element.

5. The operating device according to claim 2, wherein the surface of the control element is made of glass.

6. The operating device according to claim 2, wherein each of the plurality of segments is configured to be touch-sensitive, and each of the plurality of segments is assigned a function.

7. The operating device according to claim 2, wherein the control unit is configured to determine, as the predetermined criterion, a value of a current physical parameter of an interior of the vehicle.

8. The operating device according to claim 1, wherein each of the plurality of segments is arranged on a different plane from all other segments of the plurality of segments.

9. The operating device according to claim 8, wherein the control element further comprises:

a projection device, including a light source arranged inside the base body of the control element and configured to project symbols, each of the symbols representing the functions of the two segments, from inside the base body onto a respective segment;

wherein the two segments each have a semi-transparent area such that a projected symbol is visible from outside the control element.

10. The operating device according to claim 8, wherein the surface of the control element is made of glass.

11. The operating device according to claim 8, wherein each of the plurality of segments is configured to be touch-sensitive, and each of the plurality of segments is assigned a function.

12. The operating device according to claim 8, wherein the control unit is configured to determine, as the predetermined criterion, a value of a current physical parameter of an interior of the vehicle.

13. The operating device according to claim 1, wherein the control element further comprises:

a projection device, including a light source arranged inside the base body of the control element and configured to project symbols, each of the symbols representing the functions of the two segments, from inside the base body onto a respective segment;

wherein the two segments each have a semi-transparent area such that a projected symbol is visible from outside the control element.

14. The operating device according to claim 1, wherein the surface of the control element is made of glass.

15. The operating device according to claim 1, wherein each of the plurality of segments is configured to be touch-sensitive, and each of the plurality of segments is assigned a function.

16. The operating device according to claim 1, wherein the control unit is configured to determine, as the predetermined criterion, a value of a current physical parameter of an interior of the vehicle.

17. The operating device according to claim 1, wherein the control unit is configured to determine, as the predetermined criterion, a traffic situation in which the vehicle is located.

18. The operating device according to claim 1, wherein the control unit is configured to use a preset user profile as the predetermined criterion.

19. A vehicle comprising an operating device according to claim 1.

20. The vehicle according to claim 19, further comprising a center console, wherein the control element of the operating device is arranged on the center console.

* * * * *